(12) United States Patent
Soliman

(10) Patent No.: US 6,356,531 B1
(45) Date of Patent: Mar. 12, 2002

(54) MONITORING OF CDMA LOAD AND FREQUENCY REUSE BASED ON REVERSE LINK SIGNAL-TO-NOISE RATIO

(75) Inventor: Samir S. Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/327,103

(22) Filed: Jun. 7, 1999

(51) Int. Cl.[7] .......................... H04Q 7/20; H04Q 7/216; H04J 1/16; H04L 12/26
(52) U.S. Cl. .................. 370/241; 370/342; 455/447
(58) Field of Search ................... 370/241, 254, 370/320, 335, 342, 441, 479; 455/423, 447, 450, 501, 504, 522, 67.1, 67.3

(56) References Cited

U.S. PATENT DOCUMENTS

| 4,901,307 A | | 2/1990 | Gilhousen et al. ............ 370/18 |
| 5,056,109 A | | 10/1991 | Gilhousen et al. ............ 375/1 |
| 5,710,758 A | * | 1/1998 | Soliman et al. ............ 370/241 |
| 5,859,838 A | | 1/1999 | Soliman ................... 370/249 |
| 6,111,857 A | * | 8/2000 | Soliman et al. ............ 370/254 |

FOREIGN PATENT DOCUMENTS

| WO | 9802981 | 1/1998 |
| WO | 9824199 | 6/1998 |

OTHER PUBLICATIONS

Shin, et al. "DS–CDMA Reverse Link Channel Assignment Based on Interference Measurements" Electronic Letters 31(22): 1897–1899 (1995).
Soliman, et al. "CDMA Reverse Link Open Loop Power Control" Global Telecommunications Conference Record vol. 1: 69–73 (1992).

* cited by examiner

Primary Examiner—Wellington Chin
Assistant Examiner—Kevin C. Harper
(74) Attorney, Agent, or Firm—Phil R. Wadsworth; Kent D. Baker; Bruce W. Greenhaus

(57) ABSTRACT

A system and method for monitoring the load on a CDMA communication system having a base station and a plurality of users. A measure of voice activity in the communication system is determined, and a current value of frequency reuse efficiency equal to an initial value of frequency reuse efficiency is provided. A power determination is made according to the measured voice activity and the current value of frequency reuse efficiency. The current value of frequency reuse efficiency is updated using the power determination to provide a new current value of frequency reuse efficiency. The power determination and the update of the frequency reuse efficiency are iteratively repeated until convergence to provide a converged value of frequency reuse efficiency. The load on the communication system is then determined according to the converged frequency reuse efficiency value.

15 Claims, 3 Drawing Sheets

MONITORING OF CDMA LOAD AND FREQUENCY REUSE BASED ON REVERSE LINK SIGNAL-TO-NOISE RATIO

BACKGROUND OF THE INVENTION

I. Field of the Invention

The present invention relates to digital communications. More particularly, the present invention relates to a novel and improved system and method for monitoring the load in a CDMA system.

II. Description of the Related Art

In the field of code division multiple access (CDMA) wireless communication, a wideband frequency channel is shared by multiple communication devices, with each communication device employing a different pseudorandom noise (PN) spreading code. In a typical CDMA wireless communication system, a first frequency band is used for forward channel communications (from the base station to the mobile station), while a second frequency band, different from the first frequency band, is used for reverse channel communications (from the mobile station to the base station). An example of such a system is given in U.S. Pat. No. 4,901,307 entitled "Spread Spectrum Multiple Access Communication System Using Satellite Or Terrestrial Repeaters," issued Feb. 13, 1990, assigned to the assignee of the present invention, and incorporated herein by reference.

Fundamental to the concept of maximizing system capacity in a CDMA wireless communication system as described above is the process of power control. The output power of subscriber units must be controlled to guarantee that enough signal strength is received at the base station and to maintain good quality audio while minimizing the potential for interference. Since a CDMA wideband channel is reused in every cell, self interference caused by other users of the same cell and interference caused by users in other cells is the most limiting factor to the capacity of the system. Due to fading and other channel impairments, maximum capacity is achieved when the signal-to-noise ratio (SNR) for every user is, on the average, at the minimum point needed to support "acceptable" channel performance. Since noise spectral density is generated almost entirely by the interference from other users, all signals must arrive at the CDMA receiver with the same average power. In the mobile propagation environment, this is achieved by providing dynamic power control of the mobile station transceiver. Power control guards against changes in system loading, jamming, slow and fast variations in channel conditions, and sudden improvements or degradations in the channel (shadowing).

Power control of the mobile station transmitter consists of two elements: open loop estimation of transmit power by the mobile station, and closed loop correction of the errors in this estimate by the base station. In open loop power control, each mobile station estimates the total received power on the assigned CDMA frequency channel. Based on this measurement and a correction supplied by the base station, the mobile station transmitted power is adjusted to match the estimated path loss, to arrive at the base station at a predetermined level. All mobile stations use the same process and arrive with equal average power at the base station. However, uncontrolled differences in the forward and reverse channels, such as opposite fading that may occur due to the frequency difference and mismatches in the receive and transmit chains of the mobile station, can not be estimated by the mobile.

To reduce these residual errors, each mobile station corrects its transmit power with closed loop power control information supplied by the base station via low rate data inserted into each forward traffic channel. The base station derives the correction information by monitoring the reverse CDMA Channel quality of each mobile station, compares this measurement to a threshold, and requests either an increase or decrease depending on the result. In this manner, the base station maintains each reverse channel, and thus all reverse channels, at the minimum received power needed to provide acceptable performance. An example of a communication system employing the open loop and closed loop power control methods described above is given in U.S. Pat. No. 5,056,109 entitled "Method And Apparatus For Controlling Transmission Power In A CDMA Cellular Mobile Telephone System," assigned to the assignee of the present invention, and incorporated herein by reference.

In a CDMA wireless communication system as described above, a predetermined number of radio frequency resources, such as transceivers and channel modulator/demodulators (modems) are located at each base station. The amount of resources allocated to a base station depends upon the anticipated traffic loading conditions. For example, a system in a rural area may only have one omni-directional antenna at each base station, and enough channel modems to support eight simultaneous calls. On the other hand, a base station in a dense urban area may be co-located with other base stations, each having several highly directional antennas, and enough modems to handle forty or more simultaneous calls. It is in these more dense urban areas that cell site capacity is at a premium and must be monitored and managed closely in order to provide the most efficient allocation of limited resources while maintaining acceptable quality of communications.

Sector/cell loading is the ratio of the actual number of users in the sector to the maximum theoretical number that the sector can support. This ratio is proportional to total interference measured at the receiver of the sector/cell. The maximum number of users that the sector/cell can support is a function of the aggregate signal-to-noise ratio (SNR), voice activity, and interference from other cells. The individual subscriber unit SNR depends on subscriber unit speed, radio frequency propagation environment, and the number of users in the system. Interference from other cells depends on the number of users in these cells, radio frequency propagation losses and the way users are distributed. Typical calculations of the capacity assume equal SNR for all users and nominal values of voice activity and interference from other cells. However, in real systems, SNR changes from user to user and frequency reuse efficiency varies from sector to sector. Hence, there is a need to continuously monitor the loading of a sector or cell.

A conventional way to monitor cell site loading conditions is for a person, usually a network engineer or technician employed by a wireless communication service provider, to travel from cell to cell making loading condition readings using specially designed and expensive test equipment. The logged data is then returned to a central processing facility for post-processing and analysis. Some significant drawbacks to this method are that the data can not be evaluated in real-time, and that significant errors are introduced due to propagation effects between the base station and the measurement equipment. Thus, this monitoring method only be used in a time-delayed fashion to take corrective action, such as reassigning resources for the future. It does not enable the service provider to take any real-time action to improve loading conditions and their effect on system performance. Additionally, it requires a person to travel to each site serially, thus providing a discontinuous "hit or miss" estimate of the peak loading conditions and consequent system performance depending on whether the visit coincided with the actual (rather than assumed) peak usage times.

Another possible way of monitoring cell site loading conditions is accessing the performance data logged by the base station, or the base station controller. However, this method requires that scarce base station processing resources be diverted to collect and retrieve the loading data. Additionally, it suffers from the non-real time post-processing problems previously mentioned. It also requires that a person visit each cell site serially to retrieve the data.

One alternate method for monitoring loading in CDMA systems that is known in the prior art is the use of a dedicated channel. However, this solution is very expensive since the capacity of the dedicated channel can not be used for any other purposes. Consequently, a better way to monitor loading of CDMA communication systems is needed. These problems and deficiencies are clearly found in the art and are solved by the invention in the manner described below.

Thus it is desirable to provide a better way to perform load monitoring in CDMA systems wherein a base station determines the total amount of interference in its frequency band that it receives from all the other transmitters in the system. The load monitoring performed this way can be an important aspect of the operation and maintenance of CDMA systems. For example, load monitoring can be used to predict approaching system overloads. It can also be used to control the amount of loading in a system and to establish an admission policy for adding users to the system. The admission policy can apply to new users as well as to users already on the system and being handed off since admission of either kind of user can result in exceeding the system capacity. In addition to limiting the admission of users, steps can be taken to allocate more resources in response to load monitoring. Load monitoring can also be used to determine peak hour activities in CDMA systems.

SUMMARY OF THE INVENTION

The present invention is directed to a method and apparatus for monitoring the load on a CDMA communication system having a base station and a plurality of users. A measure of voice activity in the communication system is determined, and a current value of frequency reuse efficiency equal to an initial value of frequency reuse efficiency is provided. A power determination is made according to the determined voice activity and the current value of frequency reuse efficiency. The current value of frequency reuse efficiency is updated using the power determination to provide a new current value of frequency reuse efficiency. The power determination and the update of the frequency reuse efficiency are iteratively repeated until convergence to provide a converged value of frequency reuse efficiency. The load on the communication system is then determined in accordance with the converged frequency reuse efficiency value.

In one embodiment, after the load on the communication system is determined, the admission of new users to the communication system is controlled using the determined load value, e.g., admission of new users is denied when the load is above a threshold. Additionally, load values calculated in accordance with the present invention can be stored in order to collect peak hour activities relating to the communication system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE INVENTION

Figure 1:
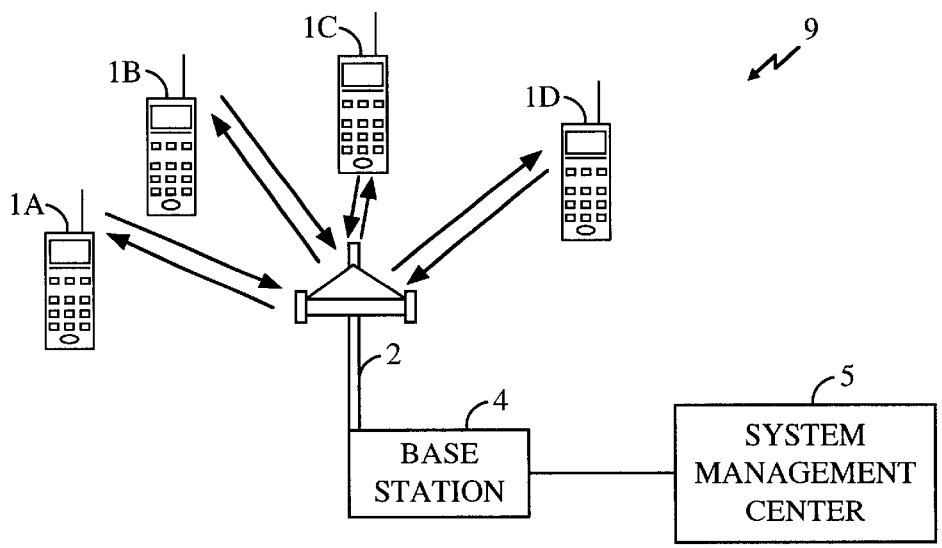
FIG. 1 shows a high level overview of the system of the present invention.

Referring now to FIG. 1, there is shown an overview of-communication system 9 of the present invention. Communication system 9 provides real time monitoring and management of system loading. Base station 4 of communication system 9 is in wireless communication with mobile stations 1A–1D by way of antenna 2. Mobile stations 1A–1D can be power controlled CDMA cellular telephones as well known in the art. Base station 4 is also in communication with system management center 5 which can contain any personnel and network computers required to perform any monitoring or management functions required within base station 4. Base station 4 and system management center 5 can communicate by any method known in the art.

In normal operation of system 9, mobile stations 1A–1D periodically communicate with base station 4, either to originate a call, receive a call, or to send or receive various overhead messages to or from base station 4. During peak usage hours, such as during the middle of the day, all four mobile stations 1A–1D may be in simultaneous communication with base station 4, thereby increasing system loading and interference on the reverse link. Conversely, during non-peak usage hours, such as during the middle of the night, fewer mobile stations 1A–1D may be in communication with base station 4 at any time, thereby decreasing system loading. It will be understood that there may be fewer or many more than four mobile stations 1A–1D simultaneously communicating with base station 4 depending on the capacity of base station 4.

In practicing the system and method of the present invention, the system loading and the frequency reuse efficiency in an active CDMA communication system can be monitored. Information about system loading can then be used by a base station controller, a base station, or any other control device to control loading, establish admission policy to the system and collect peak hour activities. In order to obtain this information and perform these operations, traffic channel SNR information available to a cell site modem is used. In particular, the energy per bit ($E_b$) to noise power spectral density ($N_t$) of a reverse traffic channel i in a sector k of the CDMA system is used. This quantity is given by $$\left(\frac{E_b}{N_t}\right)_i = x_i = \frac{(W/R_i)C_i}{N_o W + \frac{1}{F_k}\sum_{j \neq i}^{N} v_j C_j} \quad (1)$$

$$x_i\left[N_o W + \frac{1}{F_k}\sum_{j \neq i}^{N} v_j C_j\right] = \frac{W}{R_i}C_i \quad (2)$$

$$x_i \left[ N_o W + \frac{1}{F_k} \sum_{j=1}^{N} v_j C_j - \frac{1}{F_k} v_i C_i \right] = \frac{W}{R_i} C_i \quad (3)$$

$$x_i \left[ N_o W + \frac{1}{F_k} \sum_{j=1}^{N} v_j C_j \right] = \frac{W}{R_i} C_i + \frac{1}{F_k} x_i v_i C_i \quad (4)$$

$$C_i = \frac{x_i}{W/R_i + \frac{1}{F_k} v_i x_i} \left[ N_o W + \frac{1}{F_k} \sum_{j=1}^{N} v_j C_j \right] \quad (5)$$

where $N_o W$ represents the thermal/background noise, $C_i$ is the power received at the antenna connector of the base station from user i, $v_i$ is the average voice activity of user i which the base already knows, N is the number of simultaneous users in the sector, W is the bandwidth of the CDMA waveform, $R_i$ is the data rate of user i, and $F_k$ is the frequency reuse efficiency of sector k.

As explained below, the voice activity $v_i$ is calculated over N frames based on the data rate(s) used for transmission of traffic information from the mobile station during the frames. For example, in a typical CDMA system frames may be transmitted to the base station using one of four rates (i.e., full rate, ½ rate, ¼ rate and ⅛ rate). In such systems, prior to transmission, the mobile station interleaver output stream is time gated to allow transmission of certain interleaver output symbols and deletion of others. The duty cycle of the transmission gate varies with the transmit data rate. When the transmit rate is 1 (full-rate), the transmission gate allows all interleave output symbols to be transmitted. When the transmit rate is ½, the transmission gate allows one-half of the interleaver output symbols to be transmitted, and so forth. For a given time interval that includes $N_1$ frames of rate 1, $N_2$ frames of rate ½, $N_3$ frames of rate ¼, and $N_4$ frames of rate ⅛, where $N = N_1 + N_2 + N_3 + N_4$, the voice activity factor (v) averaged over N frames is calculated as follows:

$$v = \frac{N_1}{N} + \frac{1}{2} \frac{N_2}{N} + \frac{1}{4} \frac{N_3}{N} + \frac{1}{8} \frac{N_4}{N} \quad (6)$$

The frequency reuse efficiency $F_k$ mentioned above can be represented as follows:

$$F_k = \frac{\text{Interference from units within the cell}}{\text{Total interference from all cells}} \quad (7)$$

Multiplying by $v_i$ and summing Equation (5) over all values of i $$\sum_{i=1}^{N} v_i C_i = \left[ N_o W + \frac{1}{F_k} \sum_{j=1}^{N} v_j C_j \right] \sum_{i=1}^{N} \frac{v_i x_i}{W/R_i + \frac{1}{F_k} v_i x_i} \quad (8)$$

Equation (8) can be rewritten as $$\frac{\frac{1}{F_k} \sum_{i=1}^{N} v_i C_i}{\left[ N_o W + \frac{1}{F_k} \sum_{j=1}^{N} v_j C_j \right]} = \frac{1}{F_k} \sum_{i=1}^{N} \frac{v_i x_i}{W/R_i + \frac{1}{F_k} v_i x_i} \quad (9)$$

The left side of Equation (9) represents the ratio of the CDMA power to the total received power. This ratio is defined as the percentage of loading of the CDMA communication system. On the right side of Equation (9), the frequency reuse efficiency $F_k$ is an estimated value. All of the other values of the right side of Equation (9) are known. Thus it is possible to calculate the percentage of loading of the communication system if a value of the frequency reuse efficiency $F_k$ is obtained.

Figure 2A:
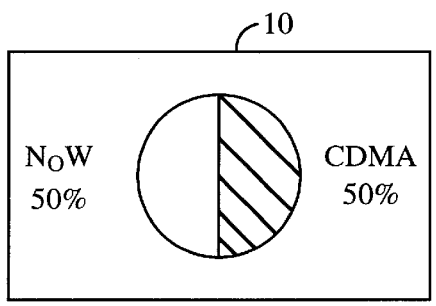
FIGS. 2A, 2B show graphical representations of possible loadings of a CDMA communication system.
Figure 2B:
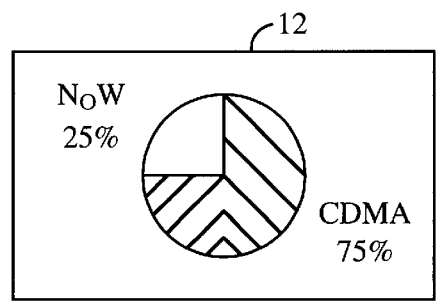

Referring now to FIGS. 2A, 2B, there are shown graphical representations 10, 12. Graphical representations 10, 12 indicate possible loadings of CDMA sectors. In the CDMA sector represented by graphical representation 10, approximately fifty percent of the received power is CDMA power and approximately fifty percent of the total received power is noise ($N_o W$). In the CDMA sector represented by graphical representation 12, approximately seventy-five percent of the total received power is CDMA power and approximately twenty-five percent of the received power is noise ($N_o W$). Thus the percentages of loading of the sectors of FIGS. 2A, 2B are fifty and seventy-five, respectively.

Figure 3:
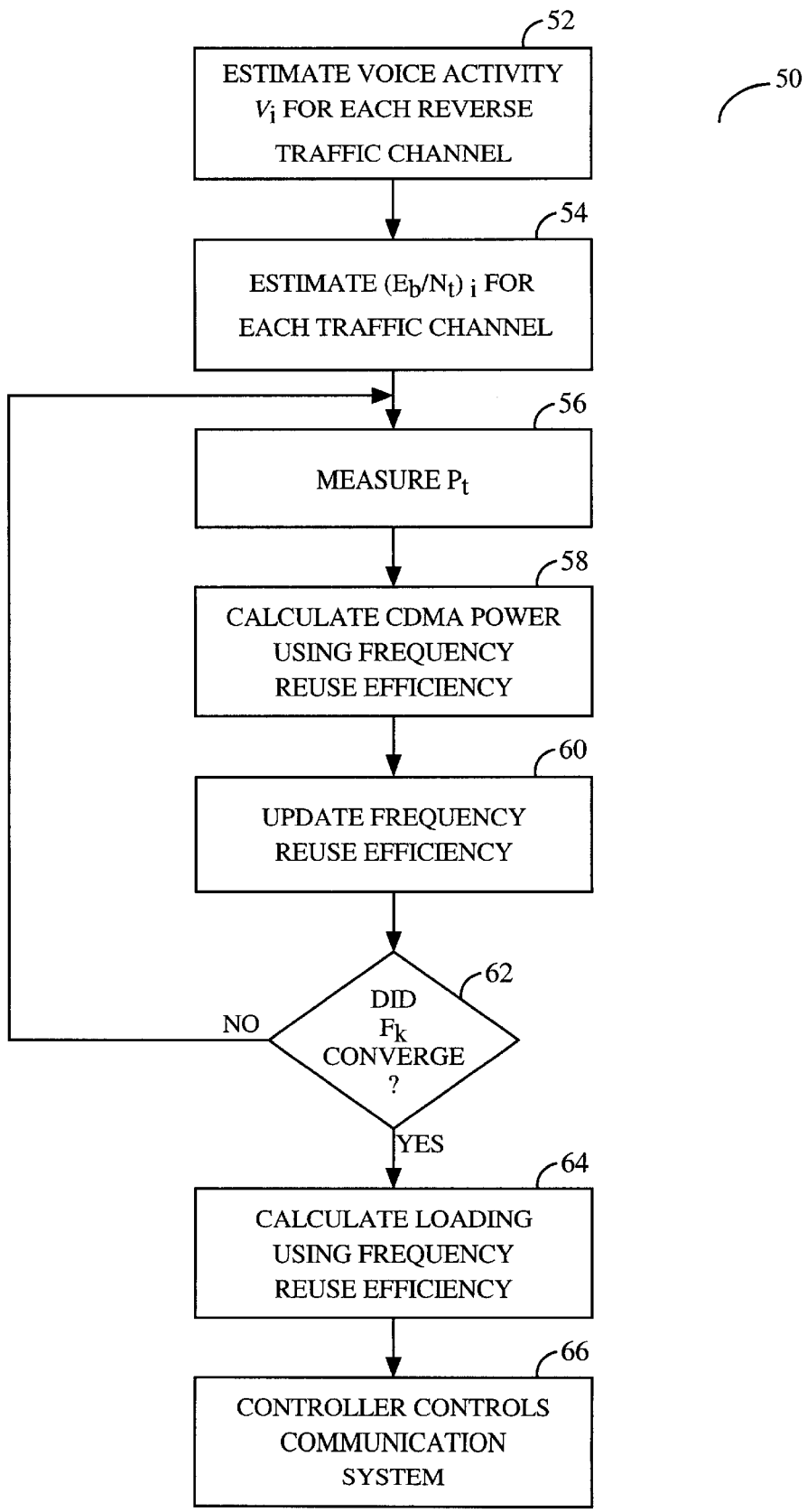
FIG. 3 shows a flow diagram of the method of the present invention.

Referring now to FIG. 3, there is shown a flow chart representation of communication system control method 50 of the present invention for load monitoring and determining frequency reuse efficiency within communication system 9. Method 50 is preferably implemented in software on a controller coupled to the cell site modem associated with the sector/cell under consideration.

When monitoring reverse RF link loading according to communication system control method 50, a CDMA communication system can estimate the voice activity $v_i$ for each reverse traffic channel i in a sector k as shown in block 52. It is known to those skilled in the art that the reverse traffic channel includes power control groups for transmitting power control information from a mobile station to the base station. At the end of each power control group a decision can be made by a channel element processor in the base station whether the transmitter of mobile i is on or off during the period of the power control group. This information can be used to determine the voice activity on traffic channel i as shown in equation (6).

For each reverse traffic channel in the sector, communication system 9 estimates the energy per bit to noise power spectral density $x_i = (E_b/N_t)_i$ as shown in block 54. Depending on the implementation, either an average or instantaneous estimate of the energy per bit to noise power spectral density $x_i = (E_b/N_t)_i$ may be used. The ratio of the energy per bit to the noise power spectral density of CDMA communication systems can be determined in different ways. One way is to use instantaneous values of $E_b/N_t$. Another involves using set point values of $E_b/N_t$. In general, the instantaneous values of $E_b/N_t$ are obtained from the base station controller and the set point values are obtained from a selector. If the instantaneous values are used, the base station processor can calculate the instantaneous loading using Equation (9) and pass the loading information to an admission control processor. If set point values from the selector are used, the base station controller can use Equation (9) to calculate the load corresponding to the determined set points. It will be understood that the value of the reverse link energy per bit to noise power spectral density required to sustain a specific frame error rate on the reverse traffic channel of user i can be represented as $(E_b/N_t)_i$.

The total received power $$P_t = N_o W + \frac{1}{F_k} \sum_{j \neq i}^{N} v_j C_j \quad (10A)$$

is then measured as shown in block 56. This quantity is readily available from the automatic gain control circuit of a conventional base station, or alternatively may be measured in other ways known in the art. As shown in block 58, Equation (8) is used along with Equation 10(A) to calculate the CDMA power of sector k. This calculation is performed in accordance with equation 10(B) using a current value which is an estimated initial value of frequency reuse efficiency $F_k(0)$. A good initial value of $F_k(0)$ can be 0.66.

$$P_{cdma}(0) = \sum_{i=1}^{N} v_i C_i = P_t \sum_{i=1}^{N} \frac{v_i x_i}{W/R_i + \frac{1}{F_k(0)} v_i x_i} \quad (10B)$$

The frequency reuse efficiency is updated to produce a new current value as shown in block 60. During each iteration the current value of frequency reuse efficiency is updated to provide a new current value of frequency reuse efficiency. The new current value is calculated as follows:

$$F_k(1) = \frac{P_{cdma}(0)}{P_t - N_o W} \quad (11)$$

The iteration of blocks 56, 58, 60 continues until the estimate of $F_k$ converges as determined in decision block 62 according to the following:

$$P_{cdma}(n) = \sum_{i=1}^{N} v_i C_i = P_t \sum_{i=1}^{N} \frac{v_i x_i}{W/R_i + \frac{1}{F_k(n)} v_i x_i} \quad (12)$$

$$F_k(n+1) = \frac{P_{cdma}(n)}{P_t - N_o W} \quad (13)$$

The final value of the frequency reuse efficiency is thus determined according to decision 62. As shown in block 64 the sector loading is then calculated using the frequency reuse efficiency in the manner set forth in Equation (9). The operations of block 64 can be performed, for example, when two consecutive calculations of frequency reuse efficiency produce the same result within the precision of the processor performing the calculations or when two consecutive calculations of frequency reuse efficiency are within a predetermined threshold of each other. The CDMA communication system can then be controlled, for example, by a base station controller according to the system loading, the frequency reuse efficiency, or any other value obtained using communication system control method 50 as shown in block 66. For example, the admission of new users to the communication system can be controlled according to the system loading. Alternatively, the system loading can be monitored in order collect information reflecting peak hour activities at a base station.

Figure 4:
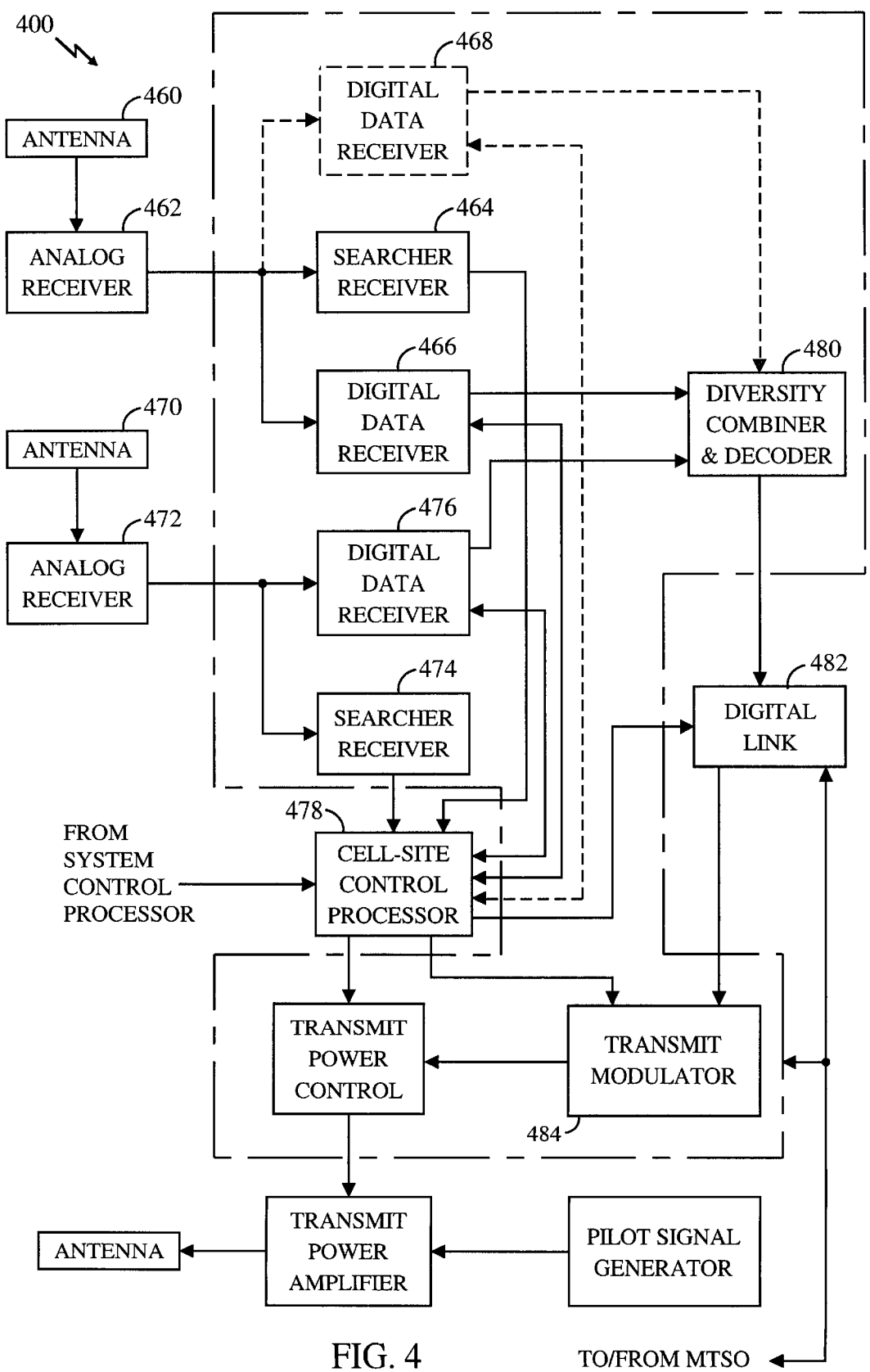
FIG. 4 is a block diagram showing the components of an exemplary base station used for implementing the position tracking system of the present invention.

Referring now to FIG. 4, there is shown a block diagram of the components of an exemplary CDMA base station 400 used for implementing the load monitoring system of the present invention. At the base station, two receiver systems are utilized with each having a separate antenna and analog receiver for diversity reception. In each of the receiver systems, the signals are processed identically until the signals undergo a diversity combination process.

The elements within the dashed lines correspond to elements corresponding to the communications between the base station and one mobile station. Referring still to FIG. 4, the first receiver system is comprised of antenna 460, analog receiver 462, searcher receiver 464 and digital data receivers 466 and 468. The second receiver system includes antenna 470, analog receiver 472, searcher receiver 474 and digital data receiver 476. Cell-site control processor 478 is used for signal processing and control. Among other things, cell site processor 478 monitors the signals sent to and received from a mobile station and uses this information to perform the load monitoring calculations described above. Thus, the system of FIG. 3 is preferably implemented in software on cell site processor 478.

Both receiver systems are coupled to diversity combiner and decoder circuitry 480. A digital link 482 is used to communicate signals from and to a base station controller or data router under the control of control processor 478. Signals received on antenna 460 are provided to analog receiver 462, where the signals are amplified, frequency translated and digitized in a process identical to that described in connection with the mobile station analog receiver. The output from the analog receiver 462 is provided to digital data receivers 466 and 468 and searcher receiver 464. The second receiver system (i.e., analog receiver 472, searcher receiver 474 and digital data receiver 476) processes the received signals in a manner similar to the first receiver system. The outputs of the digital data receivers 466, 476 are provided to diversity combiner and decoder circuitry 480, which processes the signals in accordance with a decoding algorithm. Details concerning the operation of the first and second receiver systems and the diversity combiner and decoder 480 are described in U.S. Pat. No. 5,101,501 entitled "Method and Apparatus for Providing A Soft Handoff In Communications In A CDMA Cellular Telephone System", incorporated above. Signals for transmission to mobile units are provided to a transmit modulator 484 under the control of processor 478. Transmit modulator 484 modulates the data for transmission to the intended recipient mobile station.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for monitoring the load on a CDMA communication system, comprising the steps of:
   (a) determining a measure of voice activity in the communication system;
   (b) providing a current value of frequency reuse efficiency equal to an initial value of frequency reuse efficiency;
   (c) making a power determination according to the determined voice activity and the current value of frequency reuse efficiency;
   (d) using the power determination to update the current value of frequency reuse efficiency to provide a new current value of frequency reuse efficiency;
   (e) repeating steps (c) and (d) until convergence to provide a converged frequency reuse efficiency value; and (f) determining the load on the communication system in accordance with the converged frequency reuse efficiency value.

2. The method of claim 1, wherein the communication system comprises a base station that services a plurality of mobile stations.

3. The method of claim 2, wherein step (c) comprises the steps of:
   (i) determining a total received power ($P_t$) associated with a kth sector; and
   (ii) calculating a power value ($P_{cdma}(n)$) in accordance with the total received power ($P_t$) associated with the kth sector, the determined voice activity and a current value of frequency reuse efficiency associated with the kth sector ($F_k(n)$).

4. The method of claim 3, wherein step (d) comprises the step of calculating a new current value of frequency reuse efficiency associated with the kth sector $F_k(n+1)$ using the power value ($P_{cdma}(n)$) and the total received power ($P_t$) associated with the kth sector.

5. The method of claim 4, wherein the new current value of frequency reuse efficiency $F_k(n+1)$ is determined in step (d) in accordance with the following equation:

$$F_k(n+1) = \frac{P(n)}{P_t - N_o W}$$

wherein $N_o W$ represents background noise received at the base station.

6. The method of claim 5, wherein step (e) comprises the step of repeating steps (c) and (d) until a difference between the new current value of frequency reuse efficiency $F_k(n+1)$ and the current value of frequency reuse efficiency $F_k(n)$ is less than a predetermined threshold.

7. The method of claim 6, wherein step (e) comprises the step of repeating steps (c) and (d) until the new current value of frequency reuse efficiency $F_k(n+1)$ and the current value of frequency reuse efficiency $F_k(n)$ are equal.

8. The method of claim 6, wherein step (f) comprises determining a load (L) on the communication system in accordance with the following equation:

$$L = \frac{1}{F_k} \sum_{i=1}^{N} \frac{v_i x_i}{W/R_i + \frac{1}{F_k} v_i x_i}$$

where $F_k$ is the converged frequency reuse efficiency value, $v_i$ corresponds to the voice activity measured in step (a), $R_i$ is the data rate of a user of the communication system, and $x_i$ is the energy per bit to noise power spectral density of a reverse traffic channel in the communication system.

9. The method of claim 1, wherein the communication system includes a sector, and step (f) comprises determining the load of the sector according to the converged frequency reuse efficiency value.

10. The method of claim 9, further comprising the step of controlling the communication system according to the sector loading.

11. The method of claim 1, further comprising the step of controlling the admission of new users to the communication system according to the load determined in step (f).

12. The method of claim 1, further comprising the step of collecting peak hour activities according to the load value determined in step (f).

13. The method of claim 1, wherein the initial value of frequency reuse efficiency is approximately 0.66.

14. A system for monitoring the load on a CDMA communication system, comprising:
   (a) a value representing voice activity in the communication system;
   (b) a current value of frequency reuse efficiency equal to an initial value of frequency reuse efficiency;
   (c) a value representing system power determined according to the voice activity and the current value of frequency reuse efficiency;
   (d) a new current value of frequency reuse efficiency provided by updating the current value of the frequency reuse efficiency in accordance with the value representing system power;
   (e) a converged frequency reuse efficiency value determined by performing iterative operations on the determined system power and the current value of frequency reuse efficiency; and
   (f) a controller that determines the load on the communication system according to the converged frequency reuse efficiency value.

15. A system for monitoring the load on a CDMA communication system, comprising:
   (a) means for determining a measure of voice activity in the communication system;
   (b) means for providing a current value of frequency reuse efficiency equal to an initial value of frequency reuse efficiency;
   (c) means for making a power determination according to the determined voice activity and the current value of frequency reuse efficiency;
   (d) means for using the power determination to update the current value of frequency reuse efficiency to provide a new current value of the frequency reuse efficiency;
   (e) means for providing a converged frequency reuse efficiency value by performing iterative operations on the determined system power and the current value of frequency reuse efficiency; and
   (f) means for determining the load on the communication system according to the converged frequency reuse value.

* * * * *